United States Patent
Helmick et al.

(10) Patent No.: US 11,507,480 B2
(45) Date of Patent: *Nov. 22, 2022

(54) LOCALITY BASED QUORUMS

(71) Applicant: Amazon Technologies, Inc., Seattle, WA (US)

(72) Inventors: Michael T. Helmick, Seattle, WA (US); Jakub Kulesza, Bellevue, WA (US); Timothy Andrew Rath, Seattle, WA (US); Stefano Stefani, Issaquah, WA (US); David Alan Lutz, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/185,423

(22) Filed: Nov. 9, 2018

(65) Prior Publication Data

US 2019/0079839 A1 Mar. 14, 2019

Related U.S. Application Data (63) Continuation of application No. 15/413,764, filed on Jan. 24, 2017, now Pat. No. 10,127,123, which is a continuation of application No. 14/460,712, filed on Aug. 15, 2014, now Pat. No. 9,588,851, which is a continuation of application No. 13/921,938, filed on Jun. 19, 2013, now Pat. No. 8,812,897, which is a
(Continued)

(51) Int. Cl.
*G06F 11/00* (2006.01)
*G06F 11/20* (2006.01)

(52) U.S. Cl.
CPC .......... *G06F 11/2025* (2013.01); *G06F 11/00* (2013.01); *G06F 11/2028* (2013.01); *G06F 11/2041* (2013.01); *G06F 11/2097* (2013.01); *G06F 11/2046* (2013.01)

(58) Field of Classification Search
CPC .. G06F 11/00; G06F 11/1446; G06F 11/1458; G06F 11/1474; G06F 11/2025; G06F 11/2094; G06F 11/2097
See application file for complete search history.

(56) References Cited

U.S. PATENT DOCUMENTS

| | | |
|---|---|---|
| 6,823,355 B1 | 11/2004 | Novaes et al. |
| 7,403,946 B1 | 7/2008 | Taylor |
| 7,814,365 B2 | 10/2010 | Galipeau et al. |

(Continued)

OTHER PUBLICATIONS

Kotla, Ramakrishna, et al., SafeStore: A Durable and Practical Storage System, 2007, USENIX Association (Year: 2007).*

(Continued)

*Primary Examiner* — Marc Duncan
(74) *Attorney, Agent, or Firm* — S. Scott Foster; Kowert, Hood, Munyon, Rankin & Goetzel, P.C.

(57) ABSTRACT

Disclosed are various embodiments for distributing data items within a plurality of nodes. A data item that is subject to a data item update request is updated from a master node to a plurality of slave notes. The update of the data item is determined to be locality-based durable based at least in part on acknowledgements received from the slave nodes. Upon detection that the master node has failed, a new master candidate is determined via an election among the plurality of slave nodes.

19 Claims, 6 Drawing Sheets

Related U.S. Application Data continuation of application No. 12/967,187, filed on Dec. 14, 2010, now Pat. No. 8,473,775.

(56) References Cited

U.S. PATENT DOCUMENTS

| | | |
|---|---|---|
| 7,840,992 B1 | 11/2010 | Dufrene et al. |
| 7,856,480 B2 | 12/2010 | Muchow |
| 8,135,987 B2 | 3/2012 | Douceur et al. |
| 8,191,018 B1 | 5/2012 | Cullen et al. |
| 8,335,769 B2 | 12/2012 | Kesselman |
| 8,341,118 B2 | 12/2012 | Drobychev et al. |
| 8,352,424 B2 | 1/2013 | Zunger et al. |
| 8,352,482 B2 | 1/2013 | Hansen |
| 8,473,775 B1 | 6/2013 | Helmick et al. |
| 8,688,630 B2 | 4/2014 | Bernbo et al. |
| 8,812,897 B1 | 8/2014 | Helmick et al. |
| 9,588,851 B2 | 3/2017 | Helmick et al. |
| 10,127,123 B2 | 11/2018 | Helmick et al. |
| 2003/0014462 A1 | 1/2003 | Bennett et al. |
| 2003/0023680 A1 | 1/2003 | Shirriff |
| 2003/0126265 A1 | 7/2003 | Aziz et al. |
| 2004/0078654 A1 | 4/2004 | Holland et al. |
| 2005/0237926 A1 | 10/2005 | Cheng et al. |
| 2005/0262382 A1 | 11/2005 | Bain |
| 2007/0156842 A1* | 7/2007 | Vermeulen ............ G06F 16/184 709/217 |
| 2008/0077635 A1 | 3/2008 | Sporny et al. |
| 2008/0270486 A1 | 10/2008 | Hind et al. |
| 2008/0270822 A1 | 10/2008 | Fan et al. |
| 2008/0288646 A1 | 11/2008 | Hasha et al. |
| 2009/0150566 A1 | 6/2009 | Malkhi et al. |
| 2009/0157766 A1* | 6/2009 | Shen ................... G06F 11/2041 |
| 2010/0114826 A1 | 5/2010 | Voutilainen et al. |
| 2010/0250491 A1 | 9/2010 | Jin et al. |
| 2011/0035356 A1 | 2/2011 | Vukojevic |
| 2011/0099146 A1 | 4/2011 | McAlister et al. |
| 2012/0102355 A1 | 4/2012 | Krishnaprasad et al. |
| 2014/0082085 A1 | 3/2014 | Krishnaprasad et al. |
| 2014/0095813 A1 | 4/2014 | Shukla et al. |
| 2016/0203202 A1 | 7/2016 | Merriman et al. |
| 2017/0132047 A1 | 5/2017 | Voutilainen et al. |

OTHER PUBLICATIONS

Lamport, Leslie, Fast Paxos, Apr. 14, 2006, Microsoft Research (Year: 2006).*

U.S. Appl. No. 12/966,025, filed Dec. 13, 2010, Michael T. Helmick et al.

* cited by examiner

LOCALITY BASED QUORUMS

CROSS-REFERENCE TO RELATED APPLICATIONS

This application is a continuation of U.S. patent application Ser. No. 15/413,764, filed Jan. 24, 2017, which is a continuation of U.S. patent application Ser. No. 14/460,712, filed Aug. 15, 2014, now U.S. Pat. No. 9,588,851, which is a continuation of U.S. patent application Ser. No. 13/921, 938, filed Jun. 19, 2013, now U.S. Pat. No. 8,812,897, which is a continuation of U.S. patent application Ser. No. 12/967, 187, filed Dec. 14, 2010, now U.S. Pat. No. 8,473,775, which are hereby incorporated by reference herein in their entirety.

BACKGROUND

A data store, such as, for example, a non-relational database, a relational database management system (RDBMS), or other data systems may be implemented as a distributed system. Distributed systems can offer improved reliability and availability, better fault tolerance, increased performance, and easier expansion. Some distributed models employ single-master replication, where data written to a master data store is replicated to one or more secondary stores. Distributed data stores may experience difficulties if the master data store fails.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to failover recovery in a distributed data store. In one embodiment, a distributed data store can employ a single-master replication model that provides for a master data store and one or more slave data stores. The master data store can receive updates to data items stored in the distributed data store received from client systems and propagate the updates to the slave data stores. Upon propagating the update to a requisite number of slave data stores, the master data store can then consider the update as successful, durable, and/or committed to the distributed data store. To provide data durability or integrity from a client or user point of view, any update to a data item acknowledged to the user as successful in a distributed data store according to embodiments of the disclosure should be able to survive the failure of the master data store. In such a scenario, a slave data store in the distributed data store can be designated as the new master data store. To provide such failover capability to the distributed data store, the new master data store, previously a slave data store, must be able to determine at least the last successful updates committed to the distributed data store and acknowledge as successful to a client in order to properly assume its role as the master.

Figure 1:
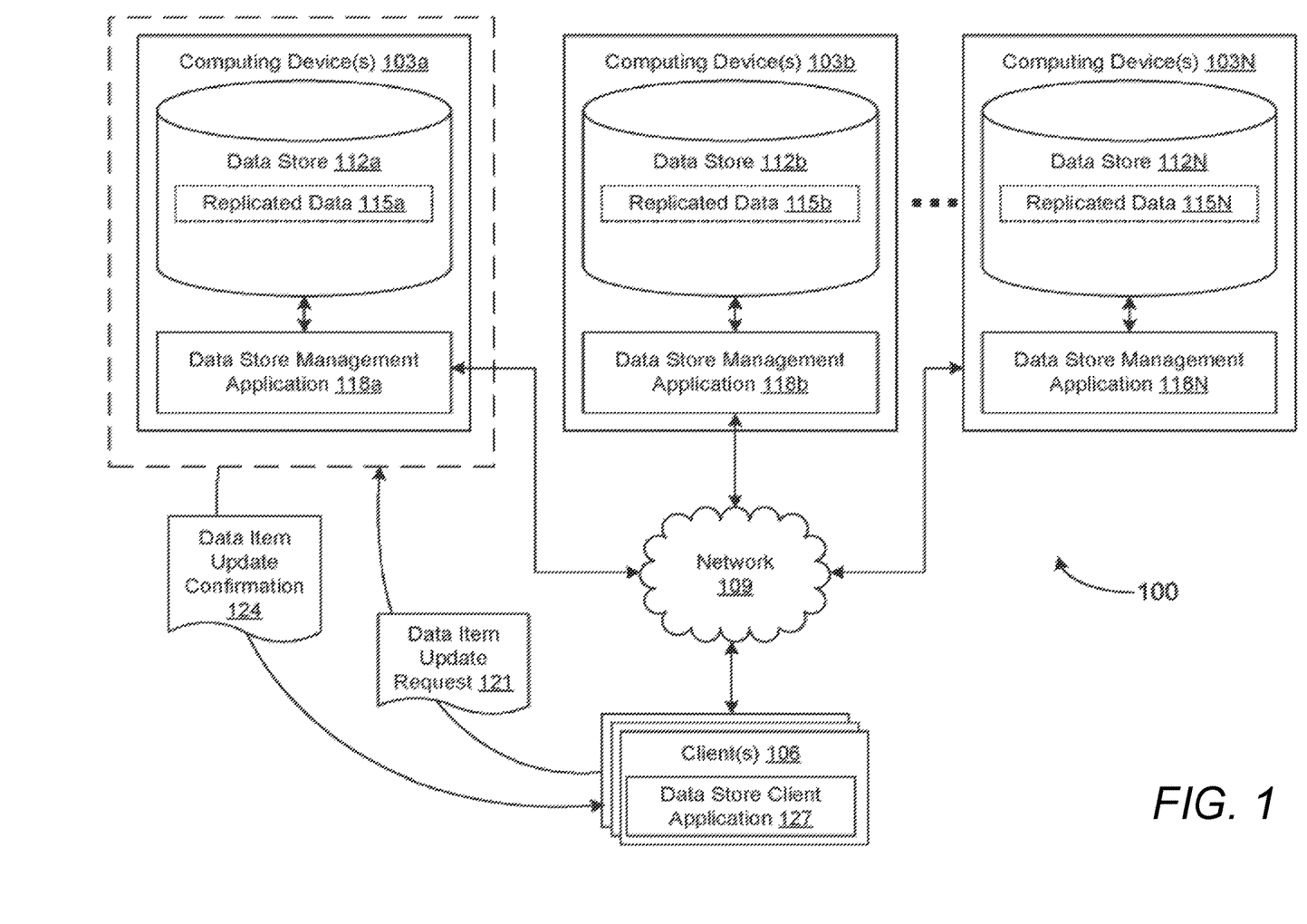
FIG. 1 is a drawing of a networked environment according to various embodiments of the present disclosure.

With reference to FIG. 1, shown is a networked environment 100 according to various embodiments. The networked environment 100 includes one or more computing devices 103a . . . 103N in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

Each of the computing devices 103a . . . 103N may comprise, for example, a server computer or any other system providing computing capability. Alternatively, a plurality of computing devices 103a . . . 103N may be employed that are arranged, for example, in one or more server banks or computer banks or other arrangements. A plurality of computing devices 103a . . . 103N together may comprise, for example, a cloud computing resource, a grid computing resource, and/or any other distributed computing arrangement. Such computing devices 103a . . . 103N may be located in a single installation or may be distributed among many different geographical locations. For purposes of convenience, the computing device 103 is referred to herein in the singular. Even though the computing device 103 is referred to in the singular, it is understood that a plurality of computing devices 103a . . . 103N may be employed in the various arrangements as described above.

Various applications and/or other functionality may be executed in the computing device 103 according to various embodiments. Also, various data is stored in a respective data store 112a . . . 112N that is accessible to the computing device 103. The respective data store 112a . . . 112N may be representative of a plurality of data stores as can be appreciated. The data stored in the data store 112, for example, is associated with the operation of the various applications and/or functional entities described below. The data stored in a data store 112 includes, for example, replicated data 115 and potentially other data. The replicated data 115 includes any data maintained in the data store 112 that can be durably persisted across a distributed data store implemented by the various computing devices 103 in the system.

The components executed on the computing device 103, for example, include a data store management application 118, and other applications, services, processes, systems, engines, or functionality not discussed in detail herein. When a computing device 103 is designated as a master data store for a distributed data store implemented by computing devices 103a . . . 103N, the data store management application 118 takes on a master role and is thus executed to manage the data store 112 and to facilitate replication of data to one or more data stores 112 accessible to computing devices 103 that are designated as slave data stores. In a master role, the data store management application 118 may obtain data item update requests 121 from the client device 106 and respond with data item update confirmations 124. The updates may take the form of writes to the data store 112, for example. The master data store management application 118 may also generate and send data item replication requests to the slave data store management applications 118 and obtain data item replication confirmations from the slave data store management applications 118.

When a computing device 103 is designated as a slave data store for a distributed data store implemented by computing devices 103a . . . 103N, the data store management application 118 takes on a slave role and is thus executed to receive data item replication requests from a master data store management application 118 and cause the corresponding data item to be stored in the data store 112 managed by the slave data store management applications 118. In other words, the slave data store management applications 118 are each configured to obtain data item replication requests from the master data store management application 118. In response to the data item replication requests, the slave data store management application 118 is configured to commit data item updates to its respective data store 112a . . . 112N and then generate and send data item replication confirmations to the master data store management application 118.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a data store client application 127 and other applications. The data store client application 127 may be executed in a client device 106, for example, to facilitate interaction with the data store management application 118. In one embodiment, the data store client application 127 may be configured, for example, to access and render network pages, such as web pages, or other network content served up by the computing device 103, a web server, a page server, or other servers for the purpose of interfacing with the data store management application 118. The client device 106 may be configured to execute applications beyond the data store client application 127 such as, for example, browser applications, email applications, instant message applications, and/or other applications.

In various embodiments, the data store client application 127 may comprise a thin client application, a thick client application, or another type of client application. Some embodiments may include a graphical user interface and/or a command-line interface. In some embodiments, the client device 106 can be configured to interact with a distributed data store provided by the computing devices 103a . . . 103N via an application programming interface (API) provided by the data store management application 118 executed in a master data store or slave data store.

A data item update request 121 is generated by a data store client application 127. Although the data store client application 127 is described as executed in a client device 106, it is understood that the client device 106 may correspond to a server computer that processes business logic, generates network pages, and/or performs other tasks. Thus, although a user may generate a data item update request 121 through a user interface, a data item update request 121 may also be generated automatically by business logic applications, workflow engines, network page generation applications, and/or other applications.

The data item update request 121 may correspond to a portion of another application, such as, for example, a module, a library, etc. in various embodiments. The data item update request 121 may be sent over the network 109 to the data store management application 118 using hypertext transfer protocol (HTTP), simple object access protocol (SOAP), remote procedure call (RPC), remote method invocation (RMI), representational state transfer (REST), Windows Communication Foundation, and/or other frameworks and protocols. In various embodiments, the data item update request 121 may describe updates to data items by using, for example, structured query language (SQL), extensible markup language (XML), JavaScript object notation (JSON), yet another markup language (YAML), and/or other formats.

Figure 2:
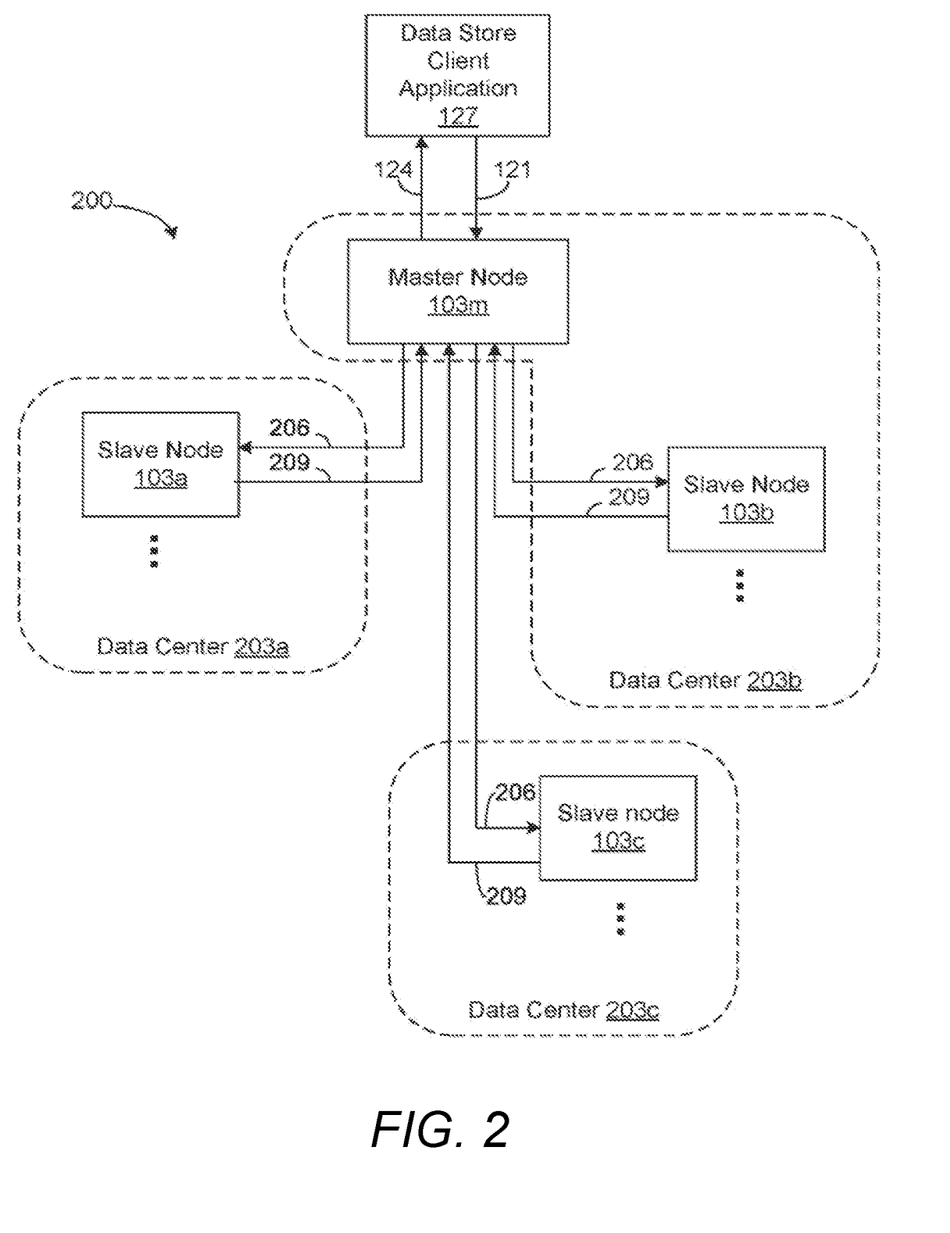
FIG. 2 is another view of the networked environment of FIG. 1 according to various embodiments of the present disclosure.

Turning now to FIG. 2, shown is another view of the networked environment 100 (FIG. 1). Where FIG. 1 focused on structure of the components, FIG. 2 focuses on how the computing devices 103a . . . 103N are distributed among physical locations. The computing devices 103a . . . 103N may be referred to herein as nodes 103 or replicated nodes 103. Together, nodes 103 function as a distributed data store 200. Each computing device 103 resides at a particular physical location, and these locations can be grouped into availability zones. A collection of computing devices 103 which all reside at the same physical location (e.g., building, campus, etc.) is commonly referred to as "data center." The example networked environment 100 of FIG. 2 includes three data centers 203a, 203b, 203c. Availability zones and/or data centers are geographically separated to some degree, but the degree of separation may vary. That is, availability zones and/or data centers can be distributed across a town, across a city, across a country, across the world, etc. Such distribution provides for greater stability of a distributed data store 200 so that if a catastrophic event occurs in one location and may affect a subset of the nodes 103 in the distributed data store 200, the catastrophic event does not jeopardize the system as a whole.

As noted above, at any point in time, one node 103 acts as a master and the other nodes 103 act as slaves. In the example networked environment 100 of FIG. 2, node 103m is the master node while nodes 103a, 103b and 103c are slave nodes. The master node 103m is located at data center 203a, as is slave node 103a. Slave node 103b is located at data center 203b and slave node 103c is located at data center 203c. It should be appreciated that a networked environment 100 can include any number of data centers, a data center 203 can include any number of nodes, and the master node can reside at any data center 203.

An overview of the operation of distributed data store 200 will now be provided. A data store client application 127 executing on a client device 106 generates a data item update request 121. The data item update request 121 is received by the master node 103m. The master node 103m sends a data item replication request 206 to the slave nodes 103a, 103b and 103c. The data item update request 121 may be an actual replica of the originally received data item update request 121, a separate request including some or all of the information in the originally received data item update request 121, or other variations as should be appreciated.

After processing the data item replication request 206, the slave nodes 103a, 103b and 103c each send a data item replication confirmation 209 back to the master node 103m. After receiving a predefined quorum of acknowledgements 209, the master node 103m responds to the data store client application 127 with a data item update confirmation 124. The quorum required to send out this data item update confirmation 124 is a locality-based durability quorum, described below in connection with FIG. 3 and FIG. 4. Because the durability quorum is defined in terms of location and the location of a node does not change, changes in the node membership does not change the composition of the durability quorum.

The distributed data store 200 includes features which facilitate recovery upon failure of the master node 103m. A failure can be represented by a hardware failure of some kind, an abnormal termination of the data store management application 118, and/or other failure as can be appreciated. Therefore, the remaining computing devices 103 executing an instance of the data store management application 118 can elect a new master node by employing a consensus algorithm. In some embodiments, the data store management application 118 executed in the various computing devices 103 can be configured to collectively employ a Paxos election scheme in order to determine the identity of the computing device 103 that will serve as the master. The election of a master among the various computing devices 103 in the distributed data store 200 can also be determined by other methods of reaching consensus in a distributed system of peers as can be appreciated. The quorum required in the election of a new master is a locality-based failover quorum, described below in connection with FIG. 3 and FIG. 5. The use of locality-based quorums for durability and for election allows the new master to synchronize with a smaller number of slave nodes as compared to a simple majority quorum, which provides a faster failover that is also fault tolerant.

Figure 3:
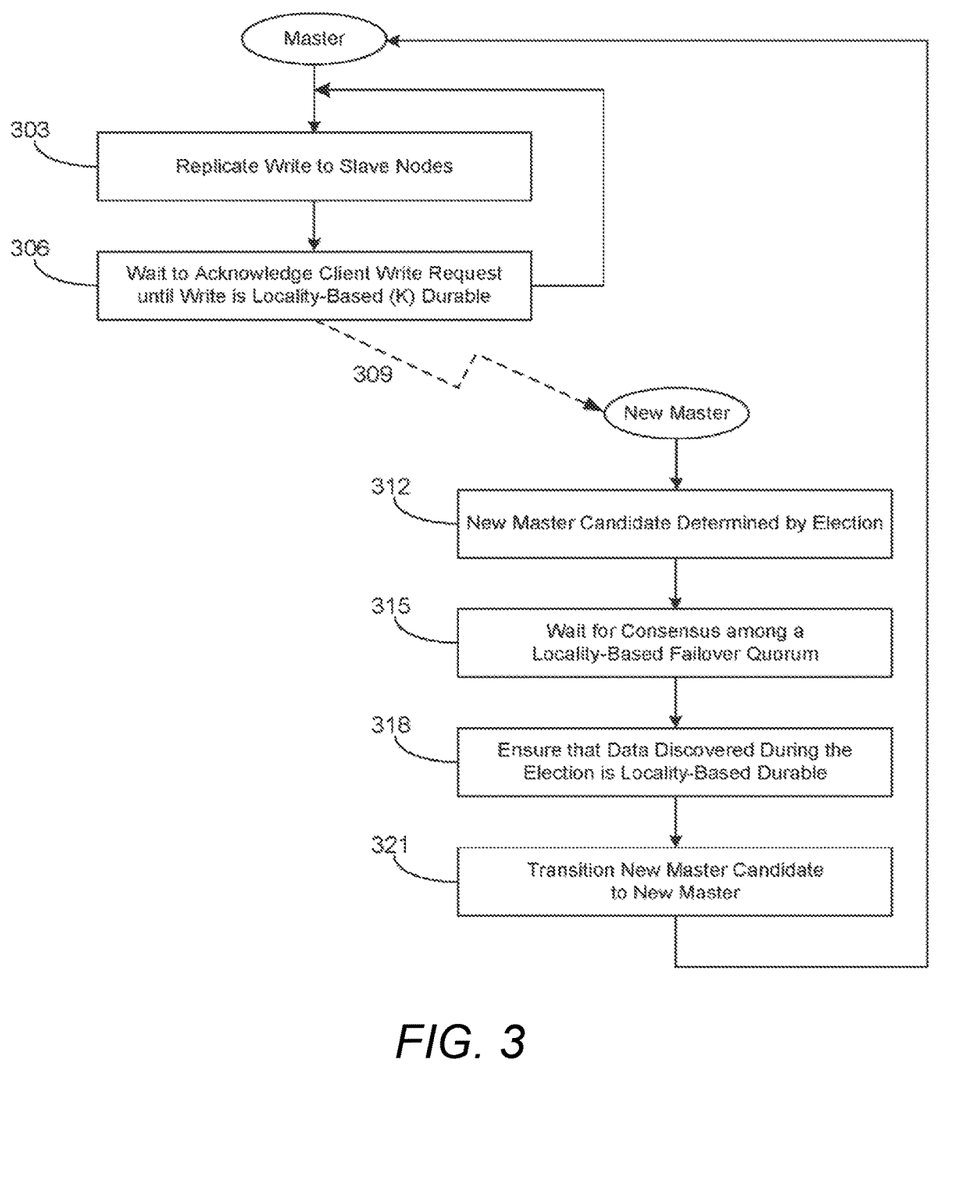
FIG. 3 is a flowchart illustrating an example of functionality implemented as portions of a data store management application executed in a computing device in the networked environment of FIG. 1 according to various embodiments of the present disclosure.

Referring next to FIG. 3, shown is a flowchart that provides one example of the operation of a portion of the data store management application 118 (FIG. 1) according to various embodiments. In particular, the flowchart of FIG. 3 illustrates aspects of a process in which a data write requested by a client is replicated in a distributed data store. It is understood that the flowchart of FIG. 3 provides merely an example of the many different types of functional arrangements that may be employed to implement the operation of the portion of the data store management application 118 as described herein. As an alternative, the flowchart of FIG. 3 may be viewed as depicting an example of steps of a method implemented in the computing device 103 (FIG. 1) according to one or more embodiments.

Beginning at box 303, the data store management application 118 (FIG. 1) executing on the master node 103m (FIG. 2) replicates a data item update request 121 (FIG. 1) to the slave nodes 103 (FIG. 2). Next at box 306, the master data store management application 118 waits for the data item update request 121 to obtain a locality-based durability quorum. As used herein, reaching a locality-based durability quorum means that a master action such as an update to the replicated data store is not considered durable until the update is acknowledged by at least one node 103 located in each of K data centers 203, where K is a configurable durability requirement for the distributed data model. K is less than N, where N is the total number of data centers 203. Gaining K-data center durability guarantees (barring a double fault scenario) that if the master node 103 fails, the succeeding master will know about, and have processed, the update.

Though FIG. 3 shows a single replicate and acknowledge path in boxes 303 and 306, some embodiments of master data store management application 118 support handling multiple replicates in parallel. The master data store management application 118 repeats the operation of boxes 303 and 306 until an event 309 indicates that a failure of the master node 103m has been detected. The event may take the form of a timeout, a message from the master node, a message from another node, or any other suitable implementation.

Upon failure detection, the data store management application 118 executing on a node 103 other than the failed master node 103m begins operating at box 312. At box 312, a new master candidate is determined by an election among nodes 103 other than the failed master node 103m. The election employs a consensus algorithm as described above. Next at box 315 the data store management application 118 on the newly elected master node 103 waits for consensus among a locality-based failover quorum before acting as the master (e.g., before receiving data item update requests 121 from clients). As used herein, locality-based failover quorum is defined as participation from all nodes 103 in N-K+1 data centers 203. Having seen full participation from the N-K+1 quorum of data centers 203 at box 315, the newly elected master is guaranteed to know about all of the updates that have gained locality-based durability. To this end, at box 318, the newly elected master ensures that all data discovered during the wait for consensus (box 315) is locality-based durable.

At box 321, having ensured that the new master candidate knows about all locality-based durable updates, the data store management application 118 executing on the newly elected master node 103 transitions from a new master candidate to the master. As such, the data store management application 118 receives data item update requests 121 from clients and processes them according to boxes 303 and 306. The use of a locality-based failover quorum together with a locality-based durability quorum means that the failover at box 318 is guaranteed to occur safely without any loss of client updates. This is true because the newly elected master node 103 is guaranteed to have seen the most recent update that the failed master had successfully completed, as well as all writes prior to that.

Figure 4:
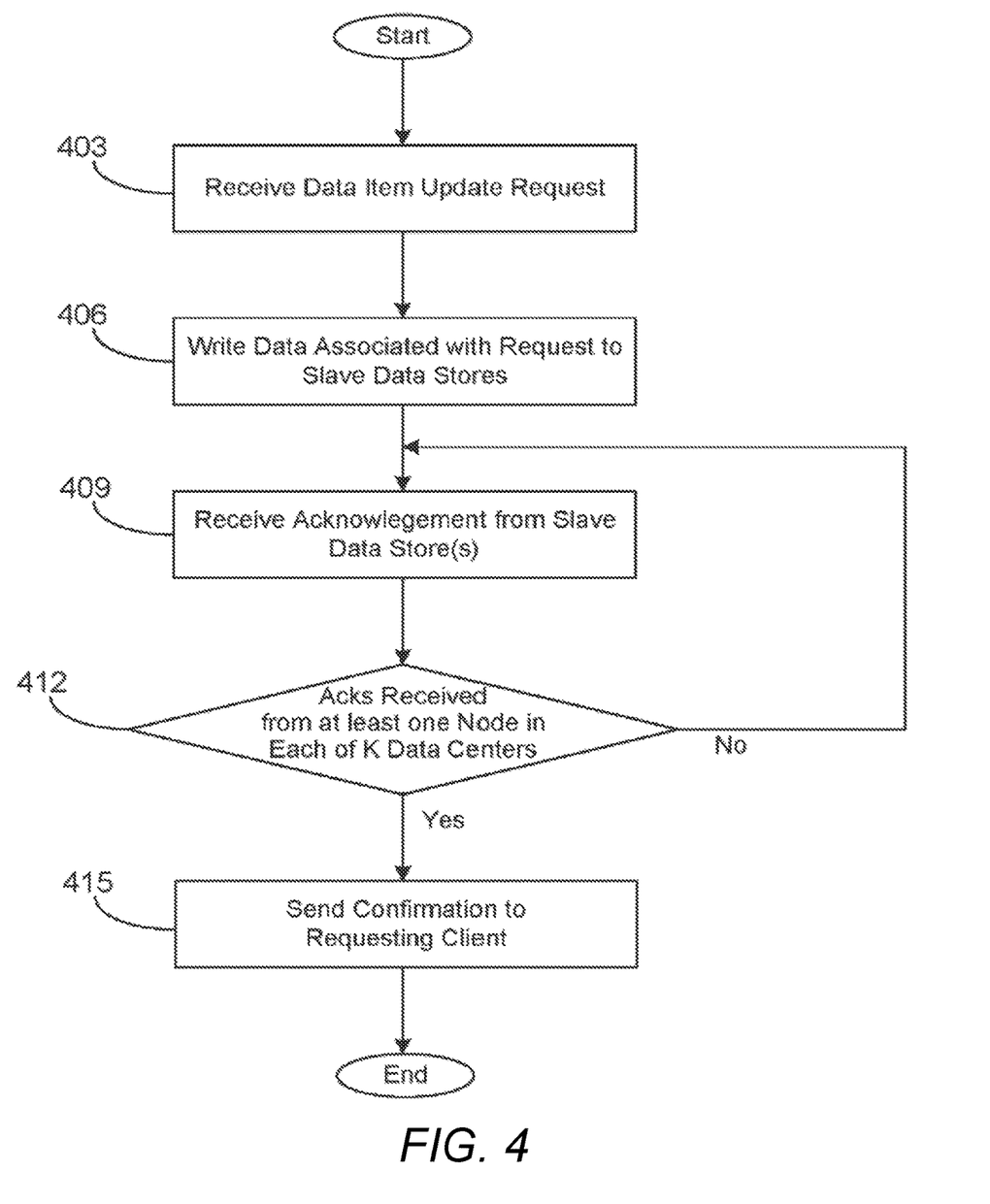
FIG. 4 is a flowchart illustrating another example of functionality implemented as portions of a data store management application executed in a computing device in the networked environment of FIG. 1 according to various embodiments of the present disclosure.

Turning now to FIG. 4, shown is a flowchart that provides additional detail for the write replication operations of FIG. 3 according to various embodiments. It is understood that the flowchart of FIG. 4 provides merely an example of the many different types of functional arrangements that may be employed to implement the operation of the portion of the data store management application 118 (FIG. 1) as described herein. As an alternative, the flowchart of FIG. 4 may be viewed as depicting an example of steps of a method implemented in the computing device 103 (FIG. 1) according to one or more embodiments.

Beginning at box 403, the data store management application 118 (FIG. 1) executing on the master node 103m (FIG. 2) receives a data item update request 121 (FIG. 1) from a data store client application 127 (FIG. 1). The data item update request 121 includes data to be updated. Next at box 406, the master data store management application 118 applies the update by sending a data item replication request 206 (FIG. 2) to each of the slave data store management applications 118. Having requested replication by the slave data stores, the master data store management application 118 now waits for the write action to be K-data center durable.

At box 409, the master data store management application 118 receives a data item replication confirmation 209 (FIG. 2) from a particular slave data store management application 118, acknowledging that the slave has committed the data item to its data store. As described above in connection with FIG. 1 and FIG. 2, each slave data store management application 118 executes on a particular node 103, where that node resides at a particular data center 203. Next at box 412 the master data store management application 118 determines whether the write is locality-based durable, i.e., whether write acknowledgements have been received at from least one node 103 located in each of K data centers 203, where K is a value less than the number of data centers 203, represented as N. If at box 412 it is determined that the write is not K-data center durable, then processing returns to block 409, where the master data store management application 118 waits for write acknowledgements from additional nodes 103.

If at box 412 it is determined that the write is K-data center 203 durable, then processing moves to block 415. At box 415, the master data store management application 118 sends a confirmation to the data store client application 127 which sent the data item update request 121 in box 403. The confirmation sent in box 415 indicates that the data item update request 121 received in box 403 was successfully performed. The process of FIG. 4 is then complete. In some embodiments, a durability timeout is used such that if locality-based durability is not achieved in a predetermined amount of time, a failure code is send to the data store client application 127 instead of a confirmation.

Figure 5:
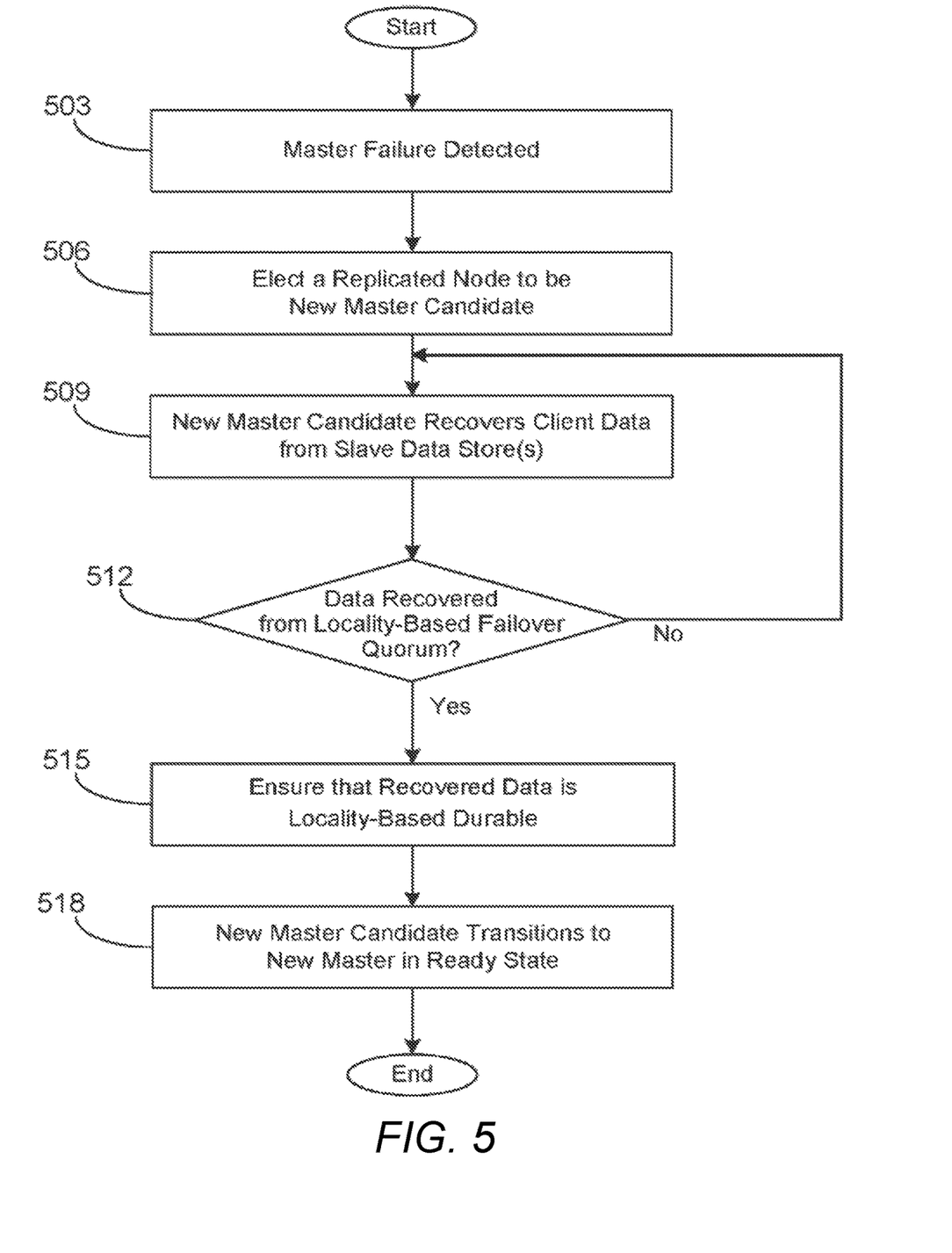
FIG. 5 is a flowchart illustrating yet another example of functionality implemented as portions of a data store management application executed in a computing device in the networked environment of FIG. 1 according to various embodiments of the present disclosure.

Moving on to FIG. 5, shown is a flowchart that provides additional detail for the new master transition operations of FIG. 3 according to various embodiments. In particular, the flowchart of FIG. 5 illustrates aspects of a single master failover in a distributed data store. It is understood that the flowchart of FIG. 5 provides merely an example of the many different types of functional arrangements that may be employed to implement the operation of the portion of the data store management application 118 (FIG. 1) as described herein. As an alternative, the flowchart of FIG. 5 may be viewed as depicting an example of steps of a method implemented in the computing device 103 (FIG. 1) according to one or more embodiments.

Beginning at box 503, a failure of the master node 103 (FIG. 1) is detected. Such a failure can be represented by a hardware failure of some kind, an abnormal termination of the master data store management application 118, and/or other failure as can be appreciated. At box 506, the remaining computing devices 103 that are executing an instance of the data store management application 118 vote in an election for a new master node 103, and a new master is elected.

At this point, the distributed data store is not yet consistent if the previous (now failed) master had received one or more data item update request from a clients and had sent corresponding replication request to some slaves, but not to the slave which is now the new master. Accordingly, at box 509, the data store management application 118 executing on the newly elected master node 103 recovers replicated client data as necessary from other slave nodes 103 to maintain data consistency. Notably, during this recovery process the newly elected master node 103 does not begin acting as master (e.g., receiving update requests from clients) until the distributed system can guarantee that the failover can occur without losing any previous writes from the failed master. To this end, at box 512 the newly elected master node 103 determines whether the data writes recovered in box 509 include participation from all nodes 103 in a predetermined quorum. Specifically, at box 512 the newly elected master node 103 determines whether recovered data has been received from a locality-based failover quorum. As noted above, the locality-based failover quorum is defined as N−K+1 data centers.

If at box 512 it is determined that the locality-based failover quorum has been reached, processing continues at block 515. At box 515, the data store management application 118 executing on the newly elected master node 103 ensures that data recovered in box 509 is locality-based durable. Having determined that the recovered data is locality-based durable, at box 518 the data store management application 118 executing on the newly elected master node 103 transitions to a state in which the application is ready to receive data item update requests 121 from clients. Determining that the locality-based failover quorum has been reached and that recovered data is locality-based durable guarantees that the failover can occur safely, by guaranteeing that the newly elected master node 103 has recovered the most recent write that the failed master had successfully completed, as well as all writes prior to that. The process of FIG. 5 is then complete.

If at box 512 it is instead determined that the locality-based failover quorum has not been reached, the data store management application 118 executing on the newly elected master node 103 returns to box 509 to wait for additional client data to be recovered from other slave nodes 103. As described above, when the locality-based failover quorum is reached, the master node 103 transitions in box 515 and the process ends.

Figure 6:
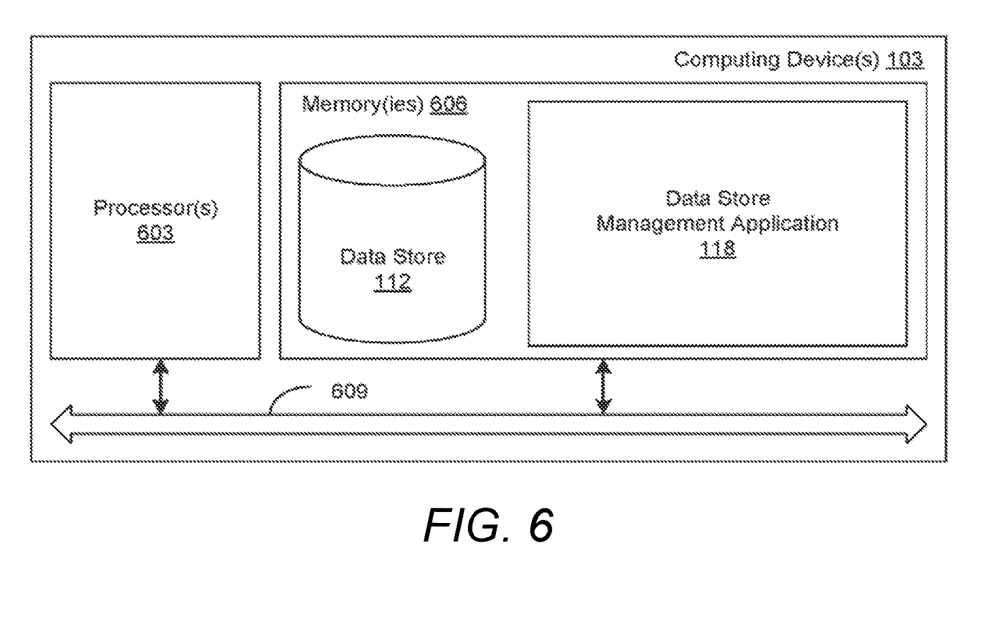
FIG. 6 is a schematic block diagram that provides one example illustration of a computing device employed in the networked environment of FIG. 1 according to various embodiments of the present disclosure.

Moving on to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the data store management application 118 and potentially other applications. Also stored in the memory 606 may be a data store 112 and other data. In addition, an operating system may be stored in the memory 606 and executable by the processor 603. While not illustrated, the client device 106 also includes components like those shown in FIG. 6, whereby data store management application 118 is stored in a memory and executable by a processor.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors, and the memory 606 may represent multiple memories that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data store management application 118 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4, and 5 show the functionality and operation of an implementation of portions of the data store management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 118, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A method, comprising:
   replicating by a master node for data stored in a distributed data store, a write to the data received by the master node to a plurality of other nodes of the distributed data store that replicate the data, wherein individual ones of the plurality of other nodes are in different respective data centers, and wherein performance of replication of the write to the data is based at least in part on a number of the plurality of other nodes that acknowledge writing to the data at the different respective data centers;
   detecting, by at least one of the plurality of other nodes, that the master node has failed based at least in part on a number of the plurality of other nodes that have acknowledged writing to the data at the different respective data centers;
   determining, among the plurality of other nodes, which one of the plurality of other nodes is to transition to being a new master node for the data; and
   performing a second write to the data using the new master node.

2. The method of claim 1, wherein the write to the data is received from a client of the distributed data store.

3. The method of claim 1, further comprising:
   after replicating the write, confirming, by the master node, to a client of the distributed data store that the write to the data is durable.

4. The method of claim 1, wherein determining, among the plurality of other nodes, which one of the plurality of other nodes is to transition to being the new master node for the data comprises:
   determining a new master candidate through an election among the plurality of other nodes in response to detecting that the master node has failed; and
   transitioning the new master candidate to become the new master node when a number of the plurality of other nodes that select the new master candidate meets a failover quorum based at least in part upon a respective location of the plurality of other nodes that select the new master candidate.

5. The method of claim 4, wherein N is a total number of the different respective data centers, wherein K is a durability requirement, and wherein the method further comprises waiting, by the new master candidate, to perform recovery from the failover quorum, wherein the failover quorum is met when recovery is performed by the plurality of other nodes that reside within N-K+1 of the different respective data centers.

6. The method of claim 4, wherein the election employs a Paxos election scheme.

7. The method of claim 1, wherein detecting that the master node has failed is based on a message received from the master node at the at least one node.

8. A method, comprising:
   determining, via at least one of a plurality of nodes that replicate data stored in a distributed data store, a new master candidate through an election among the plurality of nodes in response to detecting, by at least one of the plurality of nodes, that a master node for the data has failed based at least in part on a number of the plurality of nodes that have acknowledged writing to the data subject to a prior write request replicated by the master node to the plurality of nodes, wherein individual ones of the plurality of nodes are in respective data centers; and
   transitioning, via at least one of the plurality of nodes, the new master candidate to become a new master node for the data after waiting to recover data from a number of the plurality of nodes that meets a failover quorum based at least in part on a respective location of the plurality of nodes from which the data is recovered.

9. The method of claim 8, further comprising writing, via at least one of the plurality of nodes, to the data that is subject to the prior write request from the master node to the plurality of nodes.

10. The method of claim 8, wherein the election employs a Paxos election scheme.

11. A system, comprising:
    a plurality of computing devices that implement a distributed data store comprising a master node for data stored in the distributed data store and a plurality of other nodes that replicate the data, wherein individual ones of the plurality of other nodes are in different respective data centers;
    wherein the distributed data store is configured to:
      replicate a write to the data received by the master node to the plurality of other nodes, wherein performance of replication of the write to the data is based on a number of the plurality of other nodes that acknowledge writing to the data at the different respective data centers;
      detect, by at least one of the plurality of other nodes, that the master node has failed based at least in part on a number of the plurality of other nodes that have acknowledged writing to the data subject to write request at the different respective data centers;
      determine, among the plurality of other nodes, which one of the plurality of other nodes is to transition to being a new master node for the data; and
      perform a second write to the data using the new master node.

12. The system of claim 11, wherein to determine, among the plurality of other nodes, which one of the plurality of other nodes is to transition to being the new master node for the data, the distributed data store is configured to:
    determine a new master candidate through an election among the plurality of other nodes in response to detecting that the master node has failed; and
    transition the new master candidate to become the new master node when a number of the plurality of other nodes that select the new master candidate meets a failover quorum based at least in part upon a respective location of the plurality of other nodes that select the new master candidate.

13. The system of claim 12, wherein the election employs a Paxos election scheme.

14. The system of claim 12, wherein to replicate the write, the distributed data store is configured to:
    determine whether the write to the data is locality-based durable based at least in part on a respective location of the plurality of other nodes that have acknowledged replicating the write to the master node.

15. The system of claim 14, wherein the write to the data is determined to be locality-based durable when at least a subset of the plurality of other nodes residing in K data centers out of N data centers have acknowledged that the data item has been updated, wherein N is a total number of the different data centers.

16. The system of claim 14, wherein the master node is detected as failed after the write to the data is determined not to be locality-based durable.

17. The system of claim 14, wherein the master node:
   receives the write to the data from a client of the distributed data store; and
   confirms to the client that the write to the data is durable in response to determining that the write request to the data is locality-based durable.

18. The system of claim 14, wherein the master node sends an error code to a client of the distributed data store when the write to the data is not determined to be locality-based durable after a predefined amount of time.

19. The system of claim 14, wherein N is a total number of the different respective data centers, wherein K is a durability requirement, and wherein the distributed data store is further configured to:
   wait, by the new master candidate, to perform recovery from the failover quorum, wherein the failover quorum is met when recovery is performed by the plurality of other nodes that reside within N−K+1 of the different respective data centers.

\* \* \* \* \*